UNITED STATES PATENT OFFICE.

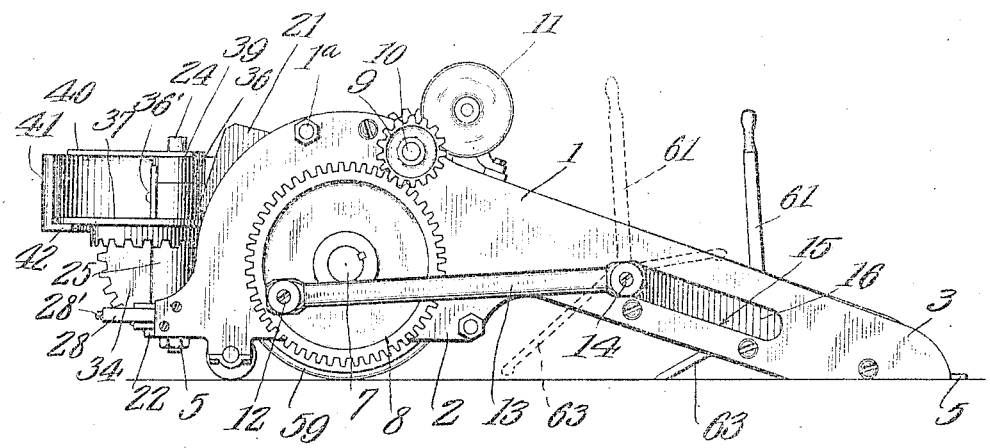

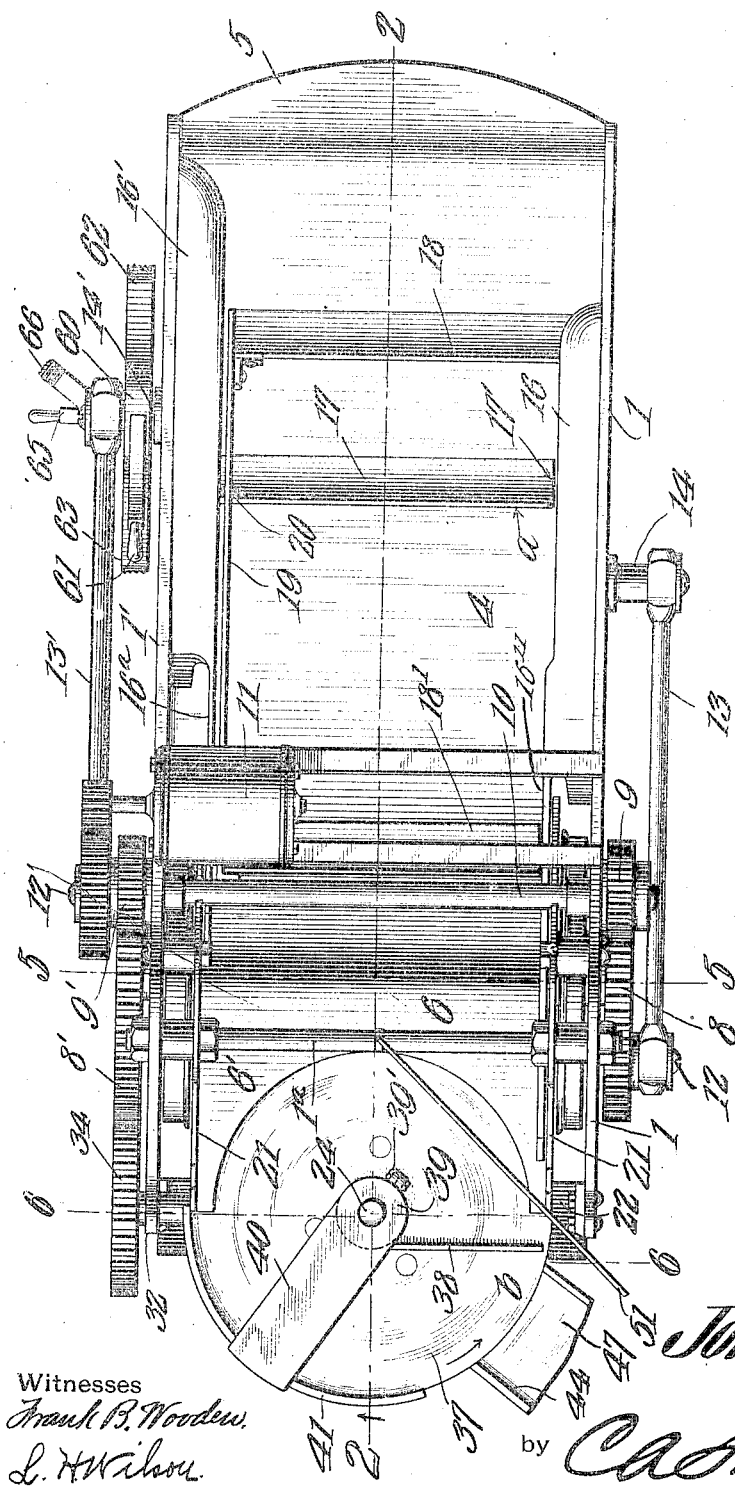

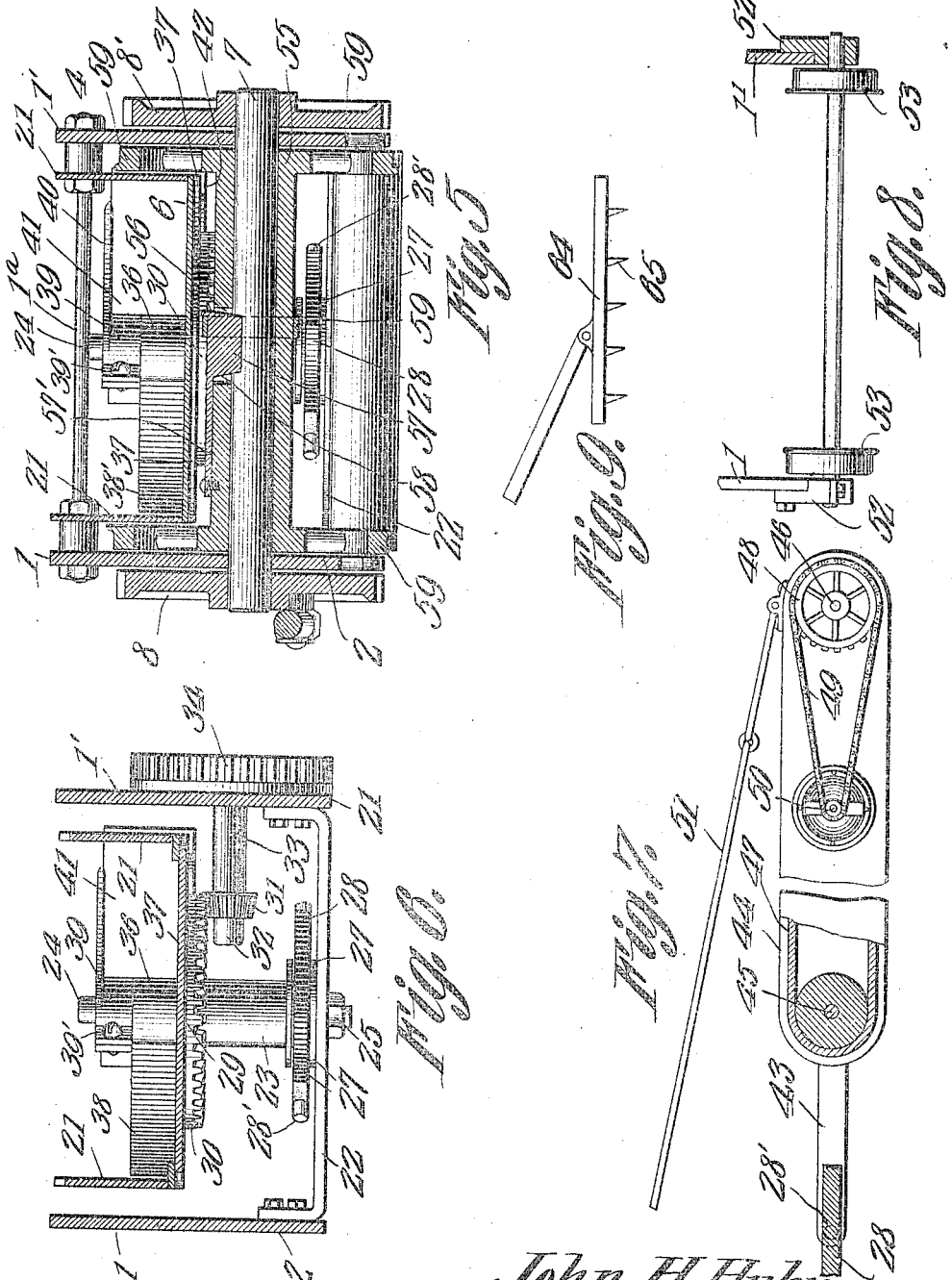

JOHN H. HUHN, OF FAIRMONT, WEST VIRGINIA, ASSIGNOR TO FAIRMONT MINING MACHINERY COMPANY, OF FAIRMONT, WEST VIRGINIA.

LOADING AND CONVEYING APPARATUS.

1,051,232.      Specification of Letters Patent.      Patented Jan. 21, 1913.

Application filed August 14, 1911. Serial No. 644,031.

*To all whom it may concern:*

Be it known that I, JOHN H. HUHN, a citizen of the United States, residing at Fairmont, in the county of Marion and State of West Virginia, have invented a new and useful Loading and Conveying Apparatus, of which the following is a specification.

The present invention relates to improvements in loading and conveying apparatus, this particular structure being especially designed for loading granular material such as coal, crushed stone or the like, and the primary object of the invention is the provision of a portable apparatus having an inclined guideway or chute adapted to be projected into the bulk of material, to present transversely disposed and longitudinally reciprocatory conveying strips or fingers of a peculiar construction to act upon the material to convey the same up the chute.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings:—Figure 1 is a side elevation of the main apparatus, dotted lines illustrating the position of the chute moving and adjusting lever and claw foot after having caused the chute and apparatus to be moved forwardly to full line position. Fig. 2 is a longitudinal section taken on line 2—2 of Fig. 4. Fig. 3 is a similar view to Fig. 1 taken from the opposite side of the apparatus. Fig. 4 is a top plan view of the apparatus as shown in Figs. 1, 2 and 3. Fig. 5 is a cross-section taken on line 5—5 of Fig. 4. Fig. 6 is a cross-section taken on line 6—6 of Fig. 4. Fig. 7 is a detail view of the axially adjustable conveyer belt used in connection with the main apparatus for conveying the material away from the machine after having received it from the rotary platform or disk conveyer. Figs. 8 and 9 are details of various parts of the apparatus detached.

Referring to the drawings, the numerals 1 and 1' designate the normally inclined sides or walls of the frame of the main apparatus, each one being held relatively to each other by means of the tie-rod 1ª, and provided with the downwardly projecting rear aprons 2 and 2', respectively, the inclined chute or guide-way 4, being mounted between the sides or walls, and having at its forward end the material engaging lip 5, projected beyond the reduced ends 3 of the sides of the frame.

Journaled in the aprons 2 and 2' is a transverse main shaft 7, having keyed upon its respective ends, exteriorly of the frame, the large gear wheels 8 and 8', respectively, which are in mesh with the respective small gears or pinions 9 and 9', carried upon the main power shaft 10, journaled in the upper portion of the frame, and operably connected to a motor 11, which may be either electric, explosive or steam, thus providing a self-contained power and mobile apparatus.

Connected by pins 12 and 12', respectively, carried eccentrically by the respective gear wheels 8 and 8', and disposed in diametrically opposed positions with relation to each other are the links 13 and 13', respectively, whose forward ends are each provided with a pin or stud 14 and 14', respectively, said pins projecting through their respective slots 15 and 15', of the sides 1 and 1' of the frame, and attached to the reciprocatory plates or beams 16 and 16', respectively. These beams 16 and 16' are mounted within and parallel to the sides or walls 1 and 1', respectively, and are adapted to be reciprocated alternately, up and down, with relation to one another.

The beam 16' carries a conveying arm or finger 17, disposed transversely of and in sliding contact with the chute 4, its outer end 17', terminating in close proximity to the beam 16 on the chute so that material cannot readily pass therebeyond during the reciprocating of the arm when operated.

The beam 16 has the lower conveying arm 18, disposed below and mounted to coact with the arm 17. The shield plate 16'', carried by the upper inner face of the beams 16, carries a similarly disposed and shaped conveying arm 18', whose outer end is held parallel to the arm 18 by means of the plate 19, which passes slidingly through the slot 20, of the arm 17.

By this construction, it will be seen that the rotation of the gears 8 and 8', will impart alternating reciprocatory movements to the links 13 and 13', and consequently to the arm 17 and the arms 18 and 18'. The arms 17, 18 and 18' are made V-shaped or wedge-shaped in cross-section, as clearly shown in Fig. 2, so that the apexes of each when moved toward the lip 5, of the chute will cut under the material upon the chute 4, and when moved up the chute the straight portion $a$ of each arm will engage and carry the material up the chute. As the arms 18 and 18', and the arm 17 have alternate reciprocatory movements imparted to them, the material is given an intermittent feed up the chute, the lowermost arm 18 entering the bulk of material and pushing the material beyond its straight edge up the chute, the arm 17 being moved downwardly during the movement of the arm 18 upwardly. Thus the arm 17 will cut under the material conveyed by the arm 18 and cause such material to pass beyond the straight edge of the arm 17, the upward movement of the arm 17 carrying such material up the chute toward the arm 18', which is now descending to cut under the material conveyed by the arm 17. By this means, it is evident that an intermittent passage is imparted to the material up the chute 4, and that the depth or quantity of the material conveying within and up the chute is regulated by the height of the straight portion $a$ of each arm.

The upper end of the beam 16' carries the shield or guide plate 16ª, which is similar to the one carried by the beam 16.

Upstanding from the upper end 6, of the chute, at opposite sides within the frame are the two walls 21, and secured to the inner face of the aprons 2 and 2', at the rear and below the shaft 7, is a bracket 22, having upstanding therefrom the column 23, carrying the stationary vertically disposed shaft 24, the said column being held to the bracket by means of the locking means 25. Mounted for swinging movement upon the reduced portion 26 of the column 23, between the plates 27, is a beam 28 having the studs 28' upon its outer ends. The purpose of this beam 28 will presently appear.

Rotatably mounted upon the shaft 24 and resting upon the column 23, is a large disk 29 having the bevel gear teeth 30, meshing with the small bevel pinion 31, carried upon the inner end of the shaft 32, journaled in the sleeve 33, and provided with a gear 34 upon its outer end, meshing at all times with the gear 8', so that the rotation of the gear 8', will impart to the disk 29 a rotary action; and as it is connected to the circular disk or conveying platform 37, by means of the bolts 38, it is evident that said platform will rotate with said disk. The disk is provided with the upwardly projecting boss 35, which fits rotatably within the socketed cap or sleeve 36, which is adjustably mounted upon the shaft 9 above the platform 37, and is held at any desired adjustment by means of a set screw 36'; and carried by this sleeve 36 is a scraper and guiding plate or arm 38, whose lower edge is adapted to rest in close sliding contact with the upper face of the disk or platform 37, and be disposed radially thereabove, so as to provide an abutting means after the material is received from the curved edge 6', of the chute to guide the material away from and off the disk or platform to the desired place, or upon a belt conveyer 47, to be hereinafter described.

In order to prevent the material, due to the centrifugal action of the rotating disk or platform, from leaving the disk or platform before being guided thereaway from by the guide 38, a sleeve 39 is adjustably mounted upon the upper end of the shaft 24, and is held in the desired adjustment by the set screw 39', the radial arm or plate 40 carried by said sleeve having attached at its outer end the curved wall 41, whose lower flanged edge 42 rests below the peripheral edge of the disk or platform 37, and thereby produces a receptacle with the disk 37 as its bottom.

In order that the material placed upon the revolving platform 37, may be removed therefrom and discharged into the conveyer 47 at point $b$ of the platform 37 (Fig. 4), the curved wall 41 is placed to guide the material to approximately the point $b$. The scraper 38 is adjusted to assume the position as shown and as the material abuts the same, the rotation of the platform will carry the material against the scraper 38, which being stationary will guide the material outwardly.

As shown in Figs. 4 and 7, a belt conveyer 47 is illustrated, the two links 43, having their inner ends connected to the studs 28 of the pivoted bar 28, so that the conveyer 47 and its casing 44, may be moved in various angular or radial positions with relation to the column 23. Disposed in the casing 44 are the two belt operating shafts 45 and 46, carrying the endless belt 47, the belt being operated through the medium of the sprocket wheel 48, belt or chain 49 and electric motor 50, carried by the casing 44. To properly hang the conveyer and its casings, a guy rope or suspension rod 51 is employed, and as shown in Fig. 4 it is pivotally connected to the center of the retaining or tie-rod 1ª.

Removably or detachably connected to the forward ends of the walls 1 and 1', in the bearings 52, is a removable shaft having mounted thereon the small flanged rail engaging wheels 53, whereby the forward end of the apparatus may be placed for transporting from place to place upon the rails of the tracks as usually employed in coal mines.

In order to properly mount the main end of the apparatus so that the apparatus may move by its own power from place to place, a sleeve 55 is fitted for movement with, or free from, the shaft 7, but in order to cause simultaneous movement of the sleeve and its flanged rail engaging wheels 59 with the shaft 7, the slot 56 is formed in the sleeve 55, and has projecting therethrough the key or lug 57, carried by a spring 57', which normally exerts a tension out of the recess 58, of the shaft 7, so that when the collar 59, is moved to the left as viewed in Fig. 5, the spring 57' will lift the key 57 out of the recess 58 of the shaft 7, so that the shaft 7 may rotate without effecting any movement of the sleeve 55. This is the normal position of the parts, when the apparatus is in loading and conveying position, and the lug 57 is thrown into the recess 58 only when it is desired to transport the apparatus from one point to another in the mine or other place. As the collar 59 is only moved to force the lug 57 into engagement with the shaft 7, or removed therefrom when the machine is at a standstill, said collar 59 may be moved with a wrench or other means to accomplish the above results.

In order that the inlet end of the chute and in fact the entire apparatus may be projected into the bulk of material, as the material is moved by the apparatus, a sleeve 60 is journaled upon the pin 14, and has a manually controlled handle or lever 61, which permits the presentation of either the claw foot 62 or 63, to the ground, whereby the rotation of the shaft 7, will impart to the link 13', such a movement, as to push the chute and entire apparatus forwardly when the foot 63 is in engagement with the ground, or rearwardly when the foot 62 is in engagement with the ground.

In order to impart a sidewise or angular movement to the inlet end of the apparatus, as is often necessary in order to reach the bulk of material at the sides of the chute, a shaft 64, having a handle 65, with the prying clawed foot 66 is employed, the same being readily accessible to the operator and in close proximity to the lever 61.

When the machine is used where the ground is soft, the claw feet 62 and 63, will be dispensed with, and in lieu thereof a plate 64, having earth engaging teeth or prongs 65, as shown in Fig. 9 is employed.

From the foregoing description taken in connection with the drawings, it is evident that a portable loading and conveying apparatus, especially adapted for use in mines for handling coal, is provided, although the same may be used for loading other granular material such as crushed stone; and that the device is provided with a chute which by means of the devices 62 and 63 may be moved so that the chute is pushed into the bulk, so as to permit the same to be engaged by the lower conveying arm 18, and with the aid of the conveying arms 17 and 18', be conveyed or pushed up the chute 4 upon the simultaneously rotating disk conveyer 37, which by its co-action with the scraper and guide 38 and curved wall 41, will conduct the material away from the conveyer 37 into cars or other vehicles, or upon the belt 47, to any desired point.

It will also be evident that the flanged traction wheels may be placed into and out of operable position to permit the apparatus to be motored from place to place, or remain stationary to be moved short distances by means of the arm or feet 62, 63 and 66.

What is claimed, is:—

1. In a loading and conveying apparatus, an inclined chute, a plurality of alternately operating and co-acting material engaging means disposed transversely of and in co-active relation with the chute, said means moving in the same plane at all times, and mechanism for operating said material engaging means.

2. In a loading and conveying apparatus, an inclined chute having its lower end the inlet end, two beams disposed upon opposite sides of the chute, material engaging means carried by said beams and disposed transversely of the chute, and mechanism for imparting alternating reciprocatory movements to said beams.

3. In a loading and conveying apparatus, an inclined chute having its lower end the inlet end, two beams mounted for reciprocatory movement upon the respective sides of the chute, transversely disposed arms carried by said beams and disposed to co-act with the bottom of the chute and with each other to convey the material up the chute, and mechanism for imparting to said beams alternate reciprocatory movements.

4. In a loading and conveying apparatus, an inclined chute having its lower end the inlet end, two beams mounted for reciprocatory movement upon the respective sides of the chute, transversely disposed arms carried by said beams, each of said arms being wedge-shaped in cross-section with the apex toward the inlet end of the chute, said arms co-acting with each other and the bottom of the chute to convey the material up the chute, and mechanism for imparting alternate reciprocatory movements to the beams.

5. In a loading and conveying apparatus, an inclined chute having its lower end the inlet end, two beams slidingly mounted in the respective sides of the chute, arms carried by said beams and disposed in co-active relation with the bottom of the chute, a power shaft, another shaft operably connected therewith, and a link operably connecting said shaft to said beams, whereby the rotary action of the shaft imparts to the beams alternating reciprocatory movements.

6. In a loading and conveying apparatus, a chute, a series of alternately reciprocatory co-acting material engaging means disposed transversely of and within the chute, said means coöperating with the bottom of the chute and in engagement therewith at all times to convey material through the chute, and mechanism for operating said material engaging means.

7. In a loading and conveying apparatus, a chute, a plurality of transversely disposed and reciprocatory conveyers mounted in the chute and operating alternately and coactively with the bottom of the chute to convey material through the chute, a power shaft, and means for operably connecting said conveyers to the power shaft.

8. In a loading and conveying apparatus, an inclined chute having its lower end the inlet end, two beams disposed upon the respective sides of the chute, said beams being capable of reciprocating movement, material engaging arms, one carried by one of said beams and two by the other beam and straddling the single arm, said arms being disposed transversely of the chute, the lower surface of said arms being in coactive material engaging and conveying contact with the chute, and mechanism for imparting alternating reciprocatory movement to said beams.

9. In a loading and conveying apparatus, an inclined chute having its lower end the inlet end, two beams disposed upon the respective sides of said chute and each capable of a sliding movement, a single arm carried by one of said beams, and two arms carried by the other of said beams, said arms being projected transversely of the chute and having their lower surface in sliding contact with the bottom of the chute, means for retaining the two arms in parallel, and mechanism for operating said beams alternately.

10. In a loading and conveying apparatus, an inclined chute having its lower end the inlet end, two beams slidingly mounted at the respective sides of the chute, a plurality of arms carried by the beams and disposed transversely of the chute, those of one beam being in coactive relation with the other arms and all arms slidably engaging the bottom of the chute, said arms being V-shaped in cross section with their apices toward the inlet end of the chute, a power shaft, another shaft operably connected therewith, and a link operably connecting the opposite ends of said last-mentioned shaft to the respective beams to impart to said beams an alternating reciprocatory movement.

11. In a loading and conveying apparatus, a portable frame, a chute carried thereby having an inlet to be projected into the bulk of the material to be operated upon, two sets of material engaging arms disposed transversely of the chute and in sliding contact with the bottom thereof, and mechanism for imparting to said sets of arms alternating reciprocatory movements.

In testimony that I claim the foregoing as my own, I have hereto affixed my signature in the presence of two witnesses.

JOHN H. HAHN.

Witnesses:
FRANK B. OCHSENREITER,
A. EASTERDAY.